(12) United States Patent
Bohlin

(10) Patent No.: US 6,880,119 B1
(45) Date of Patent: Apr. 12, 2005

(54) METHOD FOR SUPERVISING PARALLEL PROCESSES

(75) Inventor: Lars Bohlin, Älsjö (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 1033 days.

(21) Appl. No.: 09/590,172

(22) Filed: Jun. 9, 2000

(30) Foreign Application Priority Data

Jul. 1, 1999 (SE) ............................................... 9902530

(51) Int. Cl.[7] ........................... G06F 11/00; G06F 7/02; G01R 31/28; H03M 13/00

(52) U.S. Cl. ......................... 714/732; 714/11; 714/12; 714/13; 714/45; 714/819; 714/820

(58) Field of Search ............................... 714/732, 11, 12, 714/13, 45, 819, 820

(56) References Cited

U.S. PATENT DOCUMENTS

| | | | |
|---|---|---|---|
| 4,371,754 A | | 2/1983 | De et al. |
| 4,700,292 A | | 10/1987 | Campanini |
| 4,819,232 A | * | 4/1989 | Krings .......................... 714/13 |
| 5,446,875 A | * | 8/1995 | Ogisu et al. ................... 174/1 |
| 5,799,022 A | * | 8/1998 | Williams ..................... 714/797 |
| 6,357,024 B1 | * | 3/2002 | Dutton et al. ................. 714/45 |

OTHER PUBLICATIONS

W.W. Wesley Peterson and E.J. Weldon, Jr. "Error Correcting Codes", MIT Press, Cambridge, 1972.

C.L. Chen and M.Y. Hsiao Error–Correcting Codes for Semiconductor memory Applications: A State–of–the–Art Review, IBM Journal of Research and Development, vol. 28, No. 2, Mar. 1984, pp. 124–134.

J. Arlat and W.C. Carter "Implementation and Evaluation of a (b,k)—Adjacent Error–Correcting/Detecting Scheme for Supercomputer Systems", IBM Journal of Research and Development, vol. 28, No. 2, Mar. 1984, pp. 159–169.

* cited by examiner

Primary Examiner—Joseph D. Torres

(57) ABSTRACT

The present invention relates to a method of supervising parallel processors in a data system that comprises a first system CP-A and a second system CP-B. The method comprises the steps of:

generating a first status word STWA in the first system CP-A and a parallel second status word STWB in the second system CP-B;

generating in the first system CP-A a first check code CCA from the first status word STWA;

generating in the second system CP-B a second check code CCB from the second status word STWB;

sending the first check code CCA from the first system CP-A to the second system CP-B; and recreating the first data word STWA in the second system CP-B by evaluating the first check code CCA, the second check code CCB and the second data word STWB.

11 Claims, 4 Drawing Sheets

METHOD FOR SUPERVISING PARALLEL PROCESSES

FIELD OF INVENTION

The present invention relates to a method and to an arrangement for supervising parallel execution in a data system.

BACKGROUND ART

Parallel processors are used to achieve greater reliability in a synchronous data system. For instance, two central processors are operated in parallel in a telecommunications system, to obtain redundancy. One of the central processors has control over the surroundings, whereas the other central processor is inactive and functions solely to take over control should errors occur in the first processor or said processor should malfunction. Both processors operate synchronously. The status of the two processors is constantly identical during execution, provided that no error or fault exists. In order to discover the existence of a possible error or fault, each processor generates after each instruction cycle a data word that shows the internal status of the processor. The status words include bits that represent different units in respective processors. For instance, a main memory unit may be represented by one or more of the bits in the status word. An error in one of the processors is discovered by comparing the status words of respective processors with one another, after each clock cycle. In this respect, the status word generated by the first central processor is sent to the second central processor for comparison. The transmitted status word is compared in the second central processor with a corresponding status word that has been generated in a corresponding clock cycle in the second central processor. The two status words will be identical in the absence of any error or malfunctioning unit in the processors. On the other hand, the status words will differ in the event of an error or malfunctioning unit in the processors, and an analysis is made to establish which of the processors has the fault or is in error.

European Patent Application EP 00752656 A teaches an error tolerant system that includes two central processors which execute instructions in parallel and thus perform the same operations at the same points in time. A copy of each instruction from each processor is received by a control element and compared continuously.

A problem occurs with expanded processor complexity. Greater processor complexity means that more processor units must be supervised, which, in turn, means that the transmitted status words must include more bits. Moreover, status words are generated at a much higher rate in keeping with the higher execution speeds of these expanded processors. This greater complexity and higher execution speed together mean that the system requires a higher bandwidth for the transmission of status words between two parallel processors.

SUMMARY OF THE INVENTION

Greater processor complexity places higher demands on error supervision. Error supervision involves comparing the status of two parallel processes. The present invention addresses the problem incurred by the increasing necessity of transmitting more bits in a status word between the two parallel processors in order to maintain present-day supervision quality.

This problem is solved in accordance with the invention by transmitting from a first to a second system solely one check code that has been created from the first status word, instead of transmitting a full status word from said first to said second system. The first status word can be recreated in the second system with the aid of the check code and the corresponding parallel status word in the second system.

Thus, one object of the present invention is to retain present-day standards in the supervision of parallel systems without increasing the bandwidth in the transmission between said systems.

More explicitly, the problem is solved by:

Generating from the first system a check code that represents a first data word. The check code is comprised of a subset of the number of bits included in the first data word.

Transferring the check code from the first system to the second system.

Recreating the first data word from the first system by evaluating the corresponding parallel status word of the first status word from the second system. Comparison of the check word of the first status word with the check word of the second status word enables differing bits in the status words to be pointed out.

One advantage afforded by the invention is that only a few bits need be transmitted between two parallel systems in order to recreate a data word that includes significantly more bits.

Another advantage afforded by the invention is that the bandwidth can be kept low in the transmission between said two parallel systems, without detracting from the quality of the supervision.

Another advantage afforded by the invention is that present standards can be maintained in the supervision of said parallel systems, despite a large number of objects under supervision.

Another advantage afforded by the invention is that present standards can be maintained in the supervision of said parallel systems, despite higher demands on execution times.

The invention will now be described in more detail with reference to preferred embodiments thereof and also with reference to the accompanying drawings.

DESCRIPTION OF PREFERRED EMBODIMENTS

Figure 1:
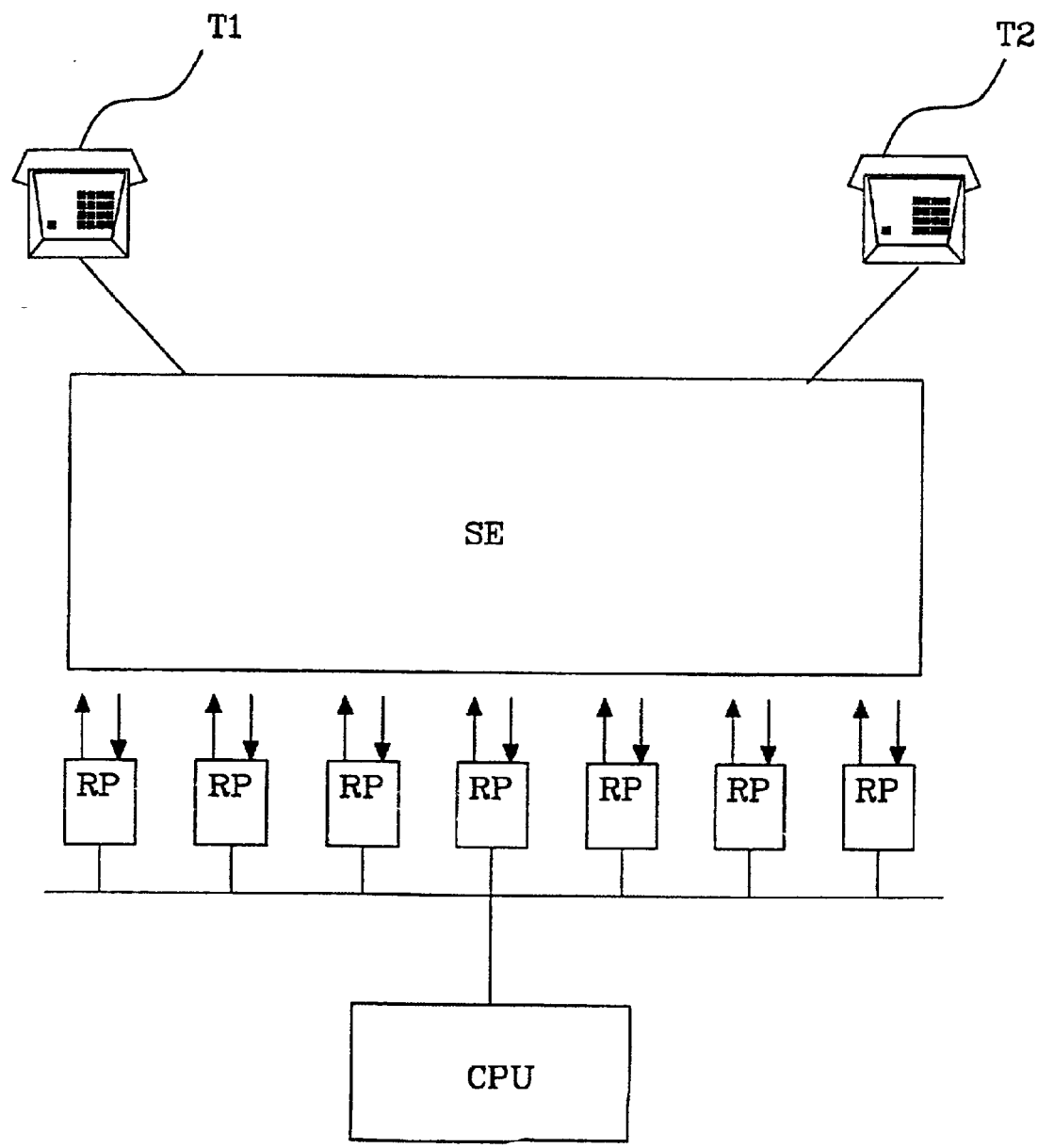
FIG. 1 illustrates a switchboard that interconnects tele-units with the aid of a central processor unit and regional processors.

FIG. 1 is a schematic illustration of a public telecommunications system. A connection can be established between two terminals T1, T2 through the medium of a switching unit SE. The switching unit SE is controlled by a central processor unit CPU and various regional processors RP. The central processor unit CPU includes parallel central processors. One of the central processors has the overall responsibility of controlling the telecommunications system while the other processor takes a passive role. The regional processors RP relieve the active central processor, by carrying out routine operations and reporting events occurring in the system.

Figure 2:
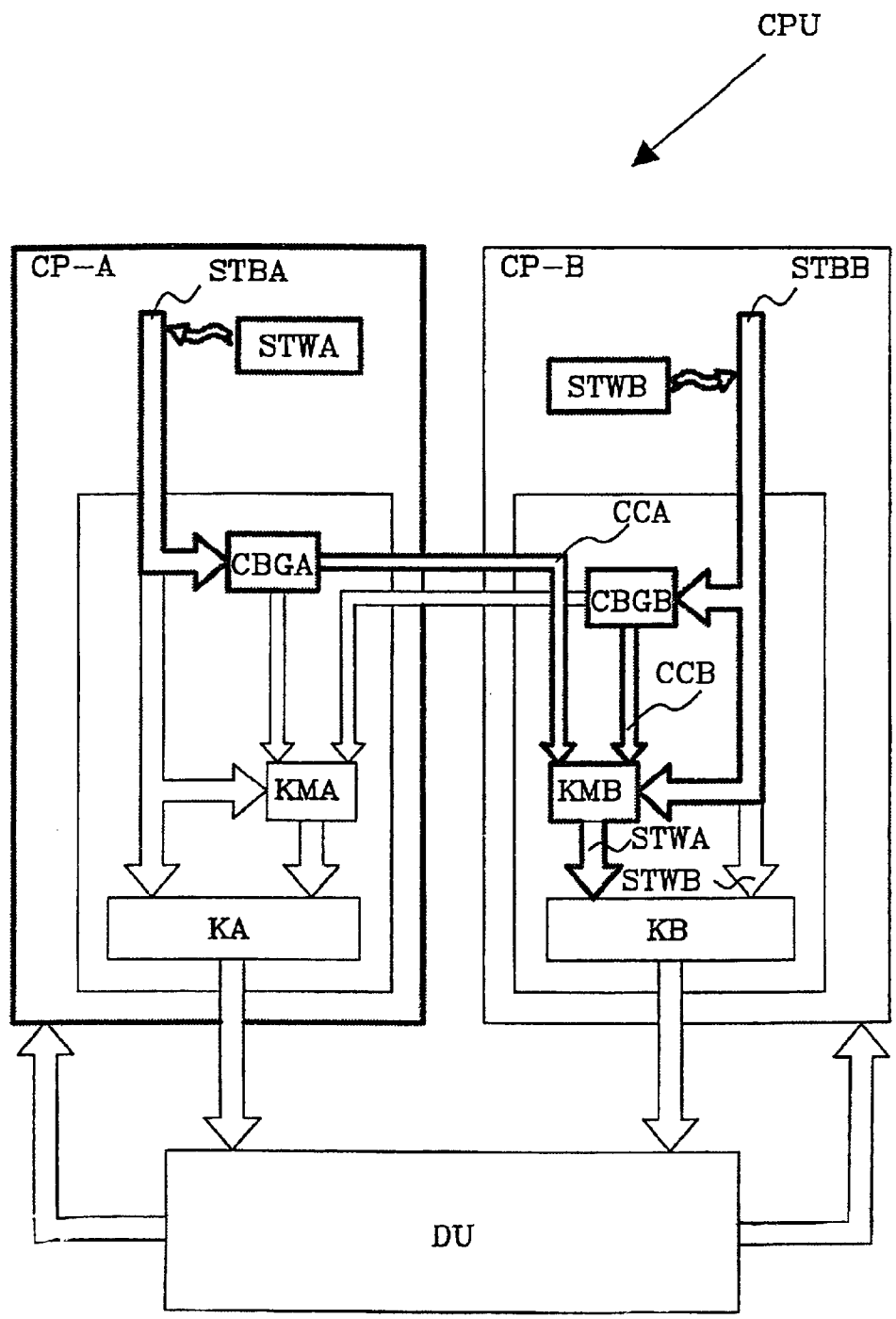
FIG. 2 is a block diagram illustrating parallel processors in the central processor unit of FIG. 1.

FIG. 2 illustrates an inventive arrangement. The arrangement illustrated includes the central processor unit CPU of FIG. 1. The processor unit includes two parallel synchronous central processors CP-A and CP-B. The two processors are referred to in the following as a first processor CP-A and a second processor CP-B. In the illustrated case, it is the first processor CP-A that has said overall responsibility, while the second processor CP-B has the more passive role. Events occur in the two central processors with each clock cycle, these events being represented by a status word in each processor. The status words reflect the status of different units in respective processors after each clock cycle. A new so-called first status word STWA is generated in the first processor CP-A after each clock cycle, while a new so-called second status word STWB is generated in the second processor. Instruction fetchers and address calculators are examples of processor units that signal their status with the aid of bits in the two status words STW1 and STW2. Both processors must be identical in order to operate in parallel and a corresponding status word STWB must be generated in the second processor CP-B at the same time as the status word STWA is generated in the first processor CP-A, in the same clock cycle. The two status words are mutually identical when all units in the two processors are error-free. The two processors thus operate in parallel, in other words perform the same work simultaneously. FIG. 2 illustrates those unit in the two processors that are of importance in understanding the concept of the invention. In the illustrated embodiment, the first processor CP-A is the processor that has the overall responsibility in the system. Those units in the two processors that are used in accordance with the invention when CP-A is active have been shown with heavily accentuated lines in FIG. 2. Each processor fetches status bits from different units, these bits forming in CP-A a status word in a status bus STBA and in CP-B a status word in a status bus STBB. Each processor includes a check bit generator, i.e. a so-called first check bit generator CBGA and a second check bit generator CBGB. Each processor CP-A and CP-B also includes a correction module, i.e. a first correction module KMA and a second correction module KMB. Each processor also includes a comparator, i.e. a first comparator KA and a second comparator KB. In addition to the two processors CB-A and CP-B, the central processor unit CPU also includes a decision unit DU. A general explanation of the invention is given below with reference to FIG. 2, followed by a more detailed explanation, with reference to FIG. 3, of those units that have a central significance to the invention. This is followed by a description of the flowchart in FIG. 4, illustrating a method according to the invention.

FIG. 2 shows a first status word STWA generated in CP-A, and a second status word STWB generated in CP-B. FIG. 2 shows units that are required to combine the first status word STWA in the first processor CP-A with the second status word STWB in the second processor CP-B, without needing to transfer the first status word STWA to the second processor. This is achieved in accordance with the invention by transferring from the first processor to the second processor solely a check code CCA that has been generated or created from the first status word, instead of transferring said first status word STWA. The first status word STWA is then recreated in the second processor CP-B. This will be explained more specifically with reference to FIG. 3. The first check code CCA is created from the first status word STWA in the check bit generator CBGA. This first check code CCA is sent to the second processor CP-B. The first check code CCA is combined with the second check code CCB in the correction module KMB in the second processor. The second check code CCB has been generated from the parallel status word STWB on the B-side. The two check codes CCA and CCB enable any bits that may differ in the two status words to be pointed out. This process will be explained in more detail with reference to FIG. 3. The first status word can be recreated in the second processor with the aid of those bits that have been pointed out as differing in the two status words STWA and STWB. This is effected by inverting the indicated bits in the second status word STWB and therewith form the status word STWA. The first status word STWA has therewith been recreated in the second processor CP-B without having transferred the whole of the first status word STWA from the first processor CP-A to the second processor CP-B. The way in which this is effected will now be described in detail with reference to FIG. 3.

Figure 3:
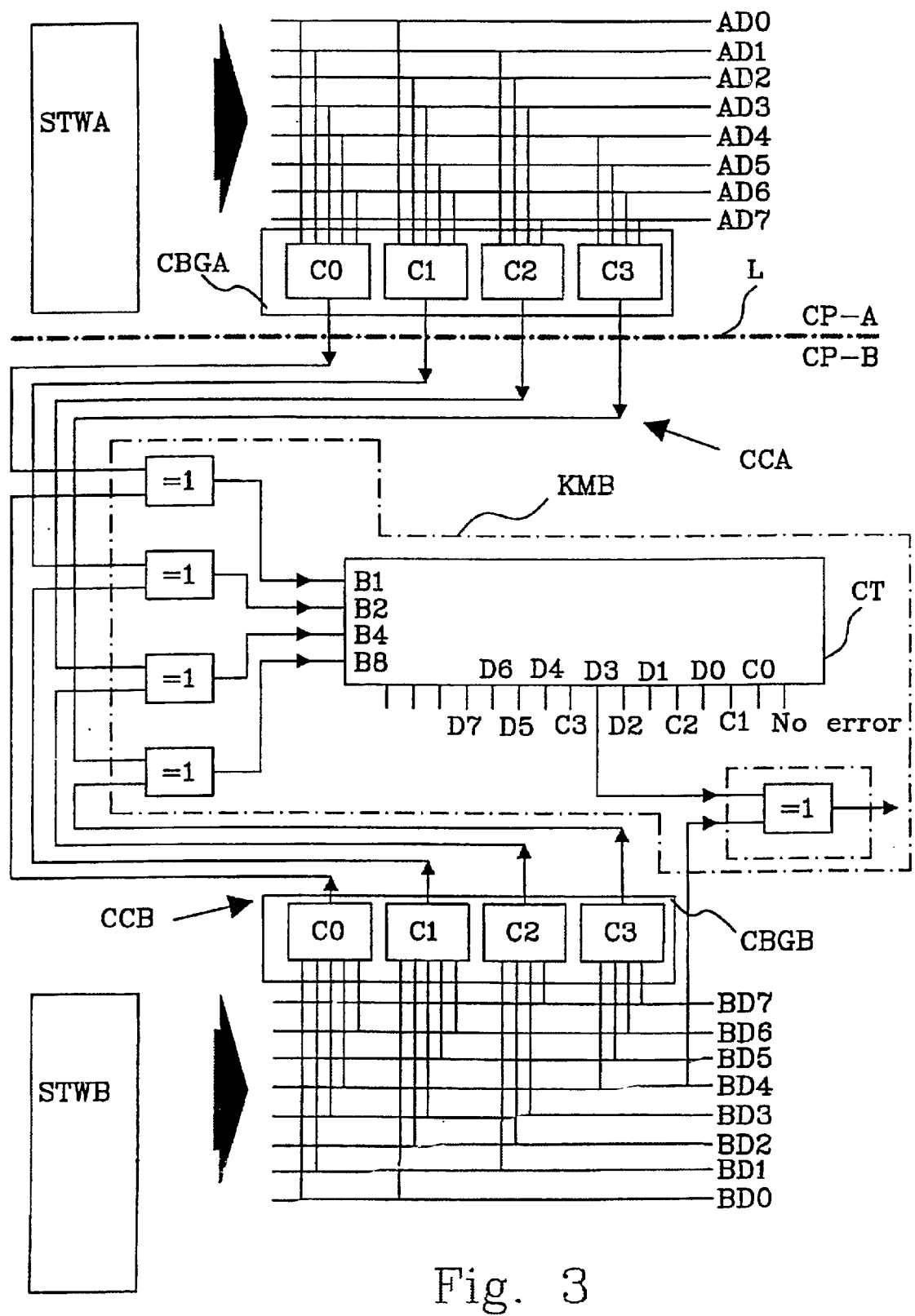
FIG. 3 is a more detailed block diagram illustrating units significant to the invention in the two parallel processors of FIG. 2.
Figure 4:
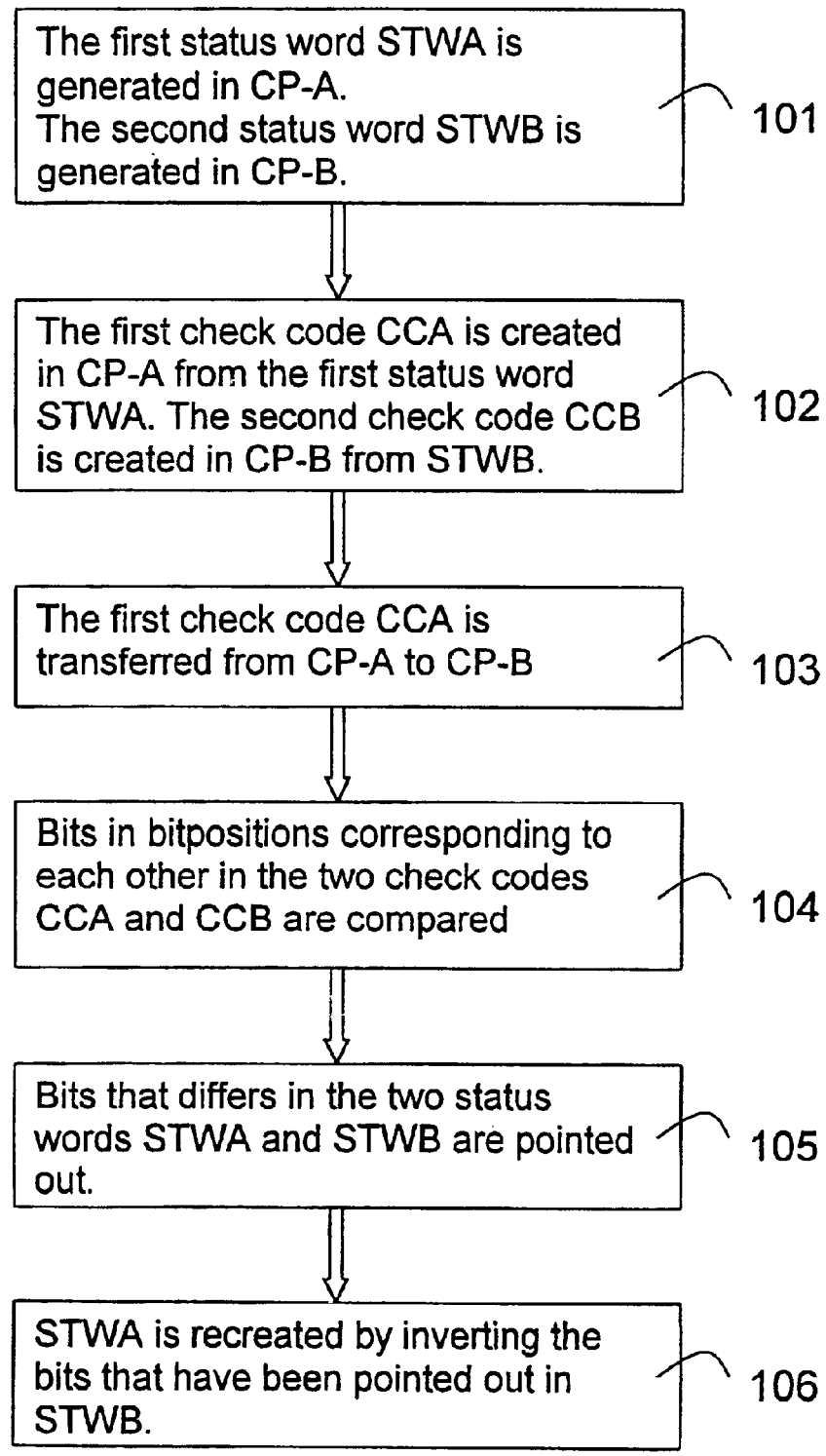
FIG. 4 is a flowchart illustrating an inventive method.

FIG. 3 illustrates a simple example of how the check codes CCA and CCB are generated and used to point out a bit error. So that the example will be more readily understood, a small data word has been used instead of a large one (for instance, 128 bits). The principle is the same, regardless of the length of the data word. Assume that the data word comprises a total of eight bits. Four check bits are required to detect a one-bit error in these eight bits. The FIG. 3 illustration includes the two processors mentioned with reference to FIG. 2. In FIG. 3, the two processors CP-A and CP-B have been mutually separated by a heavy chain line L. The first status word STWA in the first processor CP-A is represented by eight bits AD7–AD0 while the second status word STWB in the second processor CP-B is represented by the bits BD7–BD0. FIG. 3 also includes the first check bit generator CBGA shown in FIG. 2. The check bit generator CBGA generates four check bits C3–C0. In the same way, the second check bit generator CBGB generates four check bits from the eight bits BD7–BD0 in the second status word STWB on the B-side. The correction module KMB includes four ExOr gates in which check bits from the two processor sides are combined. The correction module KMB also includes a code table CT which is used to point out a bit position that differs in the two words STWA and STWB. It is first necessary to understand how the check bits C3–C0 are created before being able to understand how an erroneous bit position is picked out. Because the check bits can also change from one point in time to another, there is a total of twelve bits AD7–AD0 and C3–C0 that can change. In order to be able to point out one "erroneous" bit from these twelve bits, it is necessary to divide the bits into partially overlapping groups. This grouping is well known in the art and is found described, for instance, in "W. W. Peterson and E. J. Weldon, Jr., Error Correcting Codes, MIT Press, Cambridge, 1972".

|     | AD7/BD7 | AD6/BD6 | AD5/BD5 | AD4/BD4 | C3 | AD3/BD3 | AD2/BD2 | AD1/BD1 | C2 | AD0/BD0 | C1 | C0 |
|-----|---------|---------|---------|---------|----|---------|---------|---------|----|---------|----|----|
| B1  |         | X       |         | X       |    | X       |         | X       |    | X       |    | X  |
| B2  |         | X       | X       |         |    | X       | X       |         |    | X       | X  |    |
| B4  | X       |         |         |         |    | X       | X       | X       | X  |         |    |    |
| B8  | X       | X       | X       | X       | X  |         |         |         |    |         |    |    |

The twelve bits AD7–AD0, C3–C0 in total on the A-side are divided into four groups, as evident from the above table. The twelve bits are represented binarily by four representation bits B1, B2, B4 and B8 of different significance. The table shows the twelve bits divided into four groups where each group corresponds to one row in the table. Those representation bits marked with an "X" in the table have the value "1". Those representation bits that are not marked with an "X" have the value "0". In the first group, in the first row, there are bits which when represented binarily by the representation bits B1, B2, B4 and B8 all include the least significant bit B1="1". It will also be seen from the table that C0=0001, that D0=0011, that D1=0101, that D3=0111, that D4=1001, and that D6=1011. Thus, a common feature of the five bits C0, AD0, AD1, AD3, AD4 and AD6 is that they are all represented with the least significant bit B1="1". The second group, the second row, includes data and check bits C1, AD0, AD2, AD3, AD5 and AD6 which are all represented by B2="1". The third group includes bits C2, AD1, AD2, AD3 and AD7 that are represented by B4="1", while the fourth group includes bits C3, AD4, AD5, AD6 and AD7 that are represented by B8="1". The bits are generated when the group division is determined. The data bits (the status word) are (is) generated by the processor at each clock cycle, whereas the check bits C3–C0 are created as parity bits from the data bits AD7–AD0. The first check bit C0 is formed as a parity bit from those data bits that commonly belong to the first group, i.e. the group where B1=1. This will be apparent from FIG. 3. The data bits in the first group are as follows: AD0, AD1, AD3, AD4 and AD6. The first check bit C0 forms even parity with the data bits AD0, AD1, AD3, AD4, and AD6, i.e. when the number of binary ones in the data bits is even, the check bit C0 will have the value "0". On the other hand, if the number is an odd number, the check bit will have the value "1". The check bit C1 is formed from the bits AD0, AD2, AD3, AD5 and AD6 in the same way. The check bit C2 is formed with the aid of the data bits AD1, AD2, AD3 and AD7, whereas the check bit C3 is formed with the aid of the data bits AD4, AD5, AD6 and AD7. This method of grouping and of generating bits is well known in the art and is a common method of establishing whether or not a bit in a data word has changed from a first point in time when a first check word was generated to a second point in time when a second check word is generated.

At the same time as the check bits are generated from the first data word STWA (in the same clock cycle), check bits are generated from the second data word STWB. FIG. 3 shows how the check bits are generated from the data word on the B-side. The parity bits/check bits are formed from the same data bits as those used on the A-side. According to the invention, the check bits C3–C0 that have been generated from the first data word STWA in the processor CP-A on the A-side are transferred to the second processor CP-B on the B-side. Instead of transferring the whole of the status word STWA, which comprises eight bits, solely the four check bits C3–C0 are now transferred from the A-side to the B-side.

The check bits of the A-side are compared with the check bits of the B-side with the aid of four ExOr gates on the B-side. When all check bits from the two sides mutually coincide, all ExOr gates will take the value "0" on their respective outputs. If a bit has changed, corresponding ExOr gates will assume the value "1". The outputs of the ExOr gates are connected to the address inputs of the code table CT. The code table includes memory positions which each have a bit width of twelve bits. One of the bits has been coded to the binary value "1" in each memory position, with the exception of the first. Remaining bits in the memory positions have been coded to the binary value "0". The memory positions in the code table are grouped in accordance with the same pattern as the table shown earlier in the text and the address inputs correspond to the earlier mentioned representation bits B1, B2, B4 and B8 in said table. For instance, if there is disparity in the first check bit C0 from the status words STWA and STWB, this will result in a binary value of "1" on the output of the ExOr gate connected to the least significant address input, in other words B1 will equal "1". That the first check bit C0 from the A-side and the B-side respectively differ will mean that one of the data bits D0, D1, D3, D4 or D6 (the data bits in the first group B1 in the table) differs in both status words. Assume now that the data bits D3 in the two status words STWA and STWB differ from one another. This will result in disparity between the check bits C0, C1 and C3 and also in the address bits B1, B2 and B4 assuming the logic value "1" while address bit B8 assumes the logic value "0". The address bits B8="0", B4, B2, B1="1" will together point out the memory position that is represented by the logic value "0111", i.e. the memory position No. 7 (binary:0111). All data bits D0, D1, D2, D4, D5, D6, D7 in memory position No. 7 have the value "0", apart from the bit that represents D3, which has the value "1". This is previously inserted in the code table CT in accordance with the pattern shown in the table presented earlier in the text: D0 is pointed out with B1=B2="1", D1 is pointed out with B0=B2="1" and D3 is pointed out with B1=B2=B4="1" and so on. The next step involves combining the outputs of the memory unit with the second status word STWB via ExOr gates. Only one of the ExOr gates is shown in FIG. 3. Since all bits that represent data bits are "0", apart from the bit that represents D3, which is "1", a new data word will be created from STWB, where bit D3 has been inverted. This new data word coincides with the first data word STWA and the first data word STWA has therewith been recreated in the second processor CP-B without needing to transfer the first data word.

FIG. 2 shows the recreated status word STWA generated from the correction module KMB in the second processor CP-B. The recreated first status word STWA and the second status word STWB are forwarded to the comparitor KB in the second processor. The two status words are analysed in the comparitor KB and a directive is sent to the decision unit DU, which takes steps in establishing more specifically which unit or units in the processors is/are in error or faulty. This can be effected with the aid of different diagnostic programmes in pointed-out units.

There has been used in the example data words that have an 8-bit width. Four check bits are required to detect a bit error in an 8-bit word. Seven check bits are required to detect a bit error in a 64-bit word, while eight check bits are required to detect an error in a 128-bit word. A greater number of check bits are required to detect more than one bit error. The way in which code tables are constructed and how check bits are used in the various cases are well known in the art and can be read in "IBM Journal of Research and Development, Vol. 28, No. 2, pp. 123–230, March 1984".

FIG. 4 is a flowchart that illustrates a method according to the invention. The flowchart shall be read together with FIGS. 2 and 3. The basic concept of the method is to combine a status word from the first processor CP-A with a status word from the second processor CP-B. The first processor CP-A is the active processor. The status words are combined in the second processor CP-B without needing to transfer the whole of the status word STWA from the first processor CP-A to the second processor CP-B. Instead, check bits that represent the first status word are transferred and the first status word can thereafter be recreated in the second processor CP-B. This results in a saving in transmission bandwidth. Data has earlier been stored in the code table CT in accordance with given error correction rules. The flowchart in FIG. 4 solely illustrates those method steps that are most essential to the invention. The method comprises the following steps:

A first status word STWA is generated in the first central processor CP-A in conjunction with a clock cycle. This step is shown in FIG. 4 with a block 101.

A second status word STWB is generated in the second central processor CP-B in the same clock cycle. This step is also shown in FIG. 4 with the block 101.

The first status word STWA is read into a check bit generator CBGA in the first processor CP-A. The first check code CCA is created as parity bits from data bits in selected data positions in the first status word. This step is shown in FIG. 4 with a block 102.

The second status word STWB is read into a check bit generator CBGB in the second processor CP-B. The second check code CCB is created as parity bits from data bits in selected bit positions in the second status word. The chosen bit positions in the second word are the same as the chosen positions in the first word. This step is also shown in FIG. 4 with the block 102.

The first check code CCA is transferred from the check bit generator CBGA in the first central processor CP-A to the correction module KMB in the second central processor CP-B. This step is shown in FIG. 4 with a block 103.

The second check code CCB is written into the correction module KMB in the second central processor CP-B from the check bit generator CBGB in said second central processor CP-B.

Corresponding bits in the two check codes CCA and CCB are combined in the correction module KMB via the ExOr gates, i.e. C0 from the A-side is combined with C0 from the B-side, C1 from the A-side is compared with C1 from the B-side, and so on. This step is shown in FIG. 4 with a block 104.

Output signals from the outputs of the ExOr gates are sent to the address inputs of the code table CT.

The content of the memory position pointed out in the code table is delivered to the data outputs of said table. The bit or bits that differs/differ from the two status words is pointed out with the aid of the content of the memory position pointed out in the code table. This step is shown in FIG. 4 with a block 105.

Bits in the second status word STWB are inverted. The bits that have been inverted correspond to the bit positions that have been pointed out with the aid of the content of the memory positions in the code table CT. The changed second status word STWB corresponds to the first status word STWA. This step is shown in FIG. 4 with a block 106.

It will be understood that the invention is not restricted to the aforedescribed and illustrated exemplifying embodiments thereof, and that modifications can be made within the scope of the accompanying claims. For instance, the invention can be applied in many different types of parallel systems. The status word described in the illustrated embodiment may, of course, be comprised of some other type of word. For instance, it is conceivable to use instruction codes as status words and to compare these codes in the two systems.

What is claimed is:

1. A method of supervising parallel processes in a data system that includes a first system (CP-A) and a second system (CP-B), said method comprising the steps of:
generating a first status word (STWA) in the first system (CP-A) and a parallel second status word (STWB) in the second system (CP-B);
generating in the first system (CP-A) a first check code (CCA) from the first status word (STWA); and
generating in the second system CP-B) a second check code (CCB) from the second status word (STWB), wherein said method is characterised by the further steps of
transferring the first check code (CCA) from the first system (CP-A) to the second system (CP-B); and
recreating the first data word (STWA) in the second system (CP-B) by evaluating the first check code (CCA), the second check code (CCB) and the second data word (STWB).

2. A method according to claim 1 wherein the evaluation process comprises the steps of
pointing out at least one bit in corresponding bit positions in the two check codes that distinguishes the first check code (CCA) from a second check code (CCB); and
pointing out the at least one bit in the status words that distinguishes the first data word (STWA) from the second data word (STWB) with the aid of said at least one pointed-out bit.

3. A method according to claim 2 comprising the further step of inverting the pointed-out at least one bit in the second data word (STWB).

4. A method according to claim 3 wherein the evaluation process comprises the further steps of:
combining bits in corresponding bit positions in the two check codes (CCA, CCB) via ExOr gates; and
sending signals from the outputs of the ExOr gates to the address inputs of a code table.

5. A method according to claim 4 wherein the evaluation process comprises the further steps of
pointing out a differing bit position in the status words with the aid of an address memory position in the code table; and
combining bits in bit positions in the data word stored in the address memory position with bits in corresponding bit positions in the second status word (STWB) through the medium of ExOr gates.

6. A method according to any one of claims 2–5 comprising the further step of executing diagnostic programs in units that are represented by the bit positions pointed out in the status words.

7. An arrangement for supervising parallel processes in a data system that includes a first system (CP-A) and a second system (CP-B) and which further includes:
   means for generating a first status word (CP-A) in the first system (STWA) and a parallel second status word (CP-B) in the second system (STWB);
   means for generating a first check word (CCA) from the first status word (CCA) in the first system (CP-A);
   means for generating a second check code (CCB) from the second status word (STWB) in the second system (CP-B), characterised by
   means for sending the first check code (CCA) from the first system (CP-A) to the second system (CP-B); and
   means for recreating the first data word (STWA) in the second system (CP-B) by evaluating the first check code (CCA), the second check code (CCB) and the second data word (STWB).

8. An arrangement according to claim 7 comprising
   means for pointing out at least one bit in corresponding bit positions in the two check codes that distinguishes the first check code (CCA) from a second check code (CCB); and
   means for pointing out at least one bit in the status words that distinguishes the first data word (STWA) from the second data word (STWB) with the aid of said at least one pointed-out bit.

9. An arrangement according to claim 8 comprising means for inverting said at least one bit pointed out in the second data word (STWB).

10. An arrangement according to claim 9 comprising ExOr gates that have inputs to which bits in corresponding bit positions in the two check codes (CCA, CCB) are combined, wherein the outputs of the ExOr gates are connected to the address inputs of a code table.

11. An arrangement according to claim 10 which includes:

memory positions in the code table that point out a deviating bit position in the status words; and ExOr gate inputs over which bits in bit positions that have been stored in the data word in the address memory position are combined with bits in corresponding bit positions in the second status word (STWB).

* * * * *